(12) United States Patent
Klemola

(10) Patent No.: US 11,420,886 B2
(45) Date of Patent: Aug. 23, 2022

(54) METHOD FOR PURIFYING WATER

(71) Applicant: Martti Klemola, Tampere (FI)

(72) Inventor: Martti Klemola, Tampere (FI)

( * ) Notice: Subject to any disclaimer, the term of this patent is extended or adjusted under 35 U.S.C. 154(b) by 349 days.

(21) Appl. No.: 16/479,311

(22) PCT Filed: Jan. 18, 2018

(86) PCT No.: PCT/FI2018/050036
§ 371 (c)(1),
(2) Date: Jul. 19, 2019

(87) PCT Pub. No.: WO2018/134481
PCT Pub. Date: Jul. 26, 2018

(65) Prior Publication Data
US 2019/0375657 A1    Dec. 12, 2019

(30) Foreign Application Priority Data
Jan. 20, 2017 (FI) .......................... 20170007

(51) Int. Cl.
*C02F 1/465* (2006.01)
*C02F 1/461* (2006.01)
(Continued)

(52) U.S. Cl.
CPC .......... *C02F 1/465* (2013.01); *C02F 1/46109* (2013.01); *C02F 1/56* (2013.01);
(Continued)

(58) Field of Classification Search
CPC ...................................................... C02F 1/465
See application file for complete search history.

(56) References Cited

U.S. PATENT DOCUMENTS 3,944,478 A    3/1976 Kuji et al.
4,071,447 A    1/1978 Ramirez
(Continued)

FOREIGN PATENT DOCUMENTS

CN    103979646 A    8/2014
DE    3641365 A1    8/1988
(Continued)

OTHER PUBLICATIONS

Supplementary European Search Report, application No. 18741406. 5, dated Jun. 5, 2020, 7 Pages.
(Continued)

*Primary Examiner* — Peter Keyworth
(74) *Attorney, Agent, or Firm* — Ziegler IP Law Group, LLC

(57) ABSTRACT

A method for purification of water with a water purifier. The water purifier includes an anode and a cathode as electrodes in such a way that a gap remains between the anode and the cathode. In the method, an electric field is generated between the anode and the cathode, water for purification is conveyed to the gap and an additive enhancing floc formation is introduced to water for purification or to purified water in an amount of less than 50 g and at least 1 g, measured as dry matter, per each cubic metre of water for purification. Floc material manufactured with the method, when water for purification is municipal wastewater. The use of the floc material produced in this way as a soil conditioner or for manufacturing a soil conditioner.

10 Claims, 6 Drawing Sheets

(51) Int. Cl.
*C02F 1/56* (2006.01)
*C05F 7/00* (2006.01)
*C09K 17/40* (2006.01)
*C02F 103/10* (2006.01)

(52) U.S. Cl.
CPC ............. *C05F 7/00* (2013.01); *C09K 17/40* (2013.01); *C02F 2001/46119* (2013.01); *C02F 2001/46133* (2013.01); *C02F 2001/46171* (2013.01); *C02F 2103/10* (2013.01); *C02F 2201/003* (2013.01); *C02F 2201/4618* (2013.01); *C02F 2201/46135* (2013.01)

(56) References Cited

U.S. PATENT DOCUMENTS

| | | | |
|---|---|---|---|
| 4,872,959 | A | 10/1989 | Herbst et al. |
| 8,945,357 | B2 | 2/2015 | Boyle et al. |
| 2007/0227904 | A1* | 10/2007 | Miller ............. C02F 1/46114 205/742 |
| 2009/0020479 | A1 | 1/2009 | Jussen |
| 2012/0175315 | A1* | 7/2012 | Revington ........... B01F 5/0466 210/732 |
| 2015/0122741 | A1 | 5/2015 | Eckelberry et al. |

FOREIGN PATENT DOCUMENTS

| | | |
|---|---|---|
| EP | 0668244 A1 | 8/1995 |
| EP | 2657198 A1 | 10/2013 |
| FI | 81393 B | 6/1990 |
| FI | 115904 B | 8/2005 |
| FI | 126678 B | 3/2017 |
| GB | 1473580 A | 5/1977 |
| JP | 2013176721 A | 9/2013 |
| WO | 03062152 A1 | 7/2003 |
| WO | 2007047481 A2 | 4/2007 |
| WO | 2007050041 A1 | 5/2007 |
| WO | 2011018556 A1 | 2/2011 |
| WO | 2012164164 A1 | 12/2012 |
| WO | 2014184106 A1 | 11/2014 |
| WO | 2017046444 A1 | 3/2017 |

OTHER PUBLICATIONS

International Search Report, Application No. PCT/FI2018/050036, dated May 23, 2018, 6 pages.
Written Opinion of the International Searching Authority, Application No. PCT/FI2018/050036, dated May 23, 2018, 9 pages.
Finnish Patent Office, Office Action, U.S. Appl. No. 20/170,007, dated May 22, 2017, 7 pages.

* cited by examiner

METHOD FOR PURIFYING WATER

TECHNICAL FIELD

The aspects of the disclosed embodiments are related to water purifiers and methods for purification of water. The aspect of the disclosed embodiments are related to water purifiers based on electroflotation and purification of water by means of electroflotation. The aspects of the disclosed embodiments are related to purification of wastewater produced in small real estates, mines, factories or communities. The aspect of the disclosed embodiments are also related to material produced during electroflotation, as well as to the use of such material.

BACKGROUND

Purification of water is important as regards human activity and environmental protection, firstly, to produce drinking water and secondly, to control environmental load. For example, purification of water, such as wastewater, is needed in the industry, such as the paper, mining and chemical industries, and for purification of service waters, such as greywater (various cleaning waters) or blackwater (toilet wastewater) used in communities (e.g., residential areas) or vessels (e.g., ships).

A solution for purification of such waters is based on electroflotation. In electroflotation, the purification of water takes place by means of electric current. Electric current is passed to two electrodes: an anode, to which a voltage is applied, and a cathode, to which a voltage negative with respect to said anode is applied. Therefore, it is possible to say that a positive voltage is applied to the anode, although the absolute level of voltages in relation to ground potential, for example, is not relevant as such. Water for purification is arranged between said electrodes; thus, the water for purification functions as an electrolyte. A suitable metal electrode is typically used as the anode.

Due to said electric current, electrolytic reactions take place in the cell, as a result of which ions are dissolved in the electrolyte from the anode and hydrogen gas is reduced at the cathode. According to Archimedes' principle, hydrogen gas naturally goes up in the cell carrying precipitated impurities along with it to the surface. In this way, impurities can be separated from the surface of purified water in the top part of the cell assembly. Impurities precipitated on the surface are generally called flocs. A water purifier based on electroflotation and the cell reactions occurring in it are proposed in patent FI115904B.

Purification of water in an economical manner to the purity level required by the application is one of the challenges of electroflotation. In an overall economical solution, it is necessary to minimise electrode wear and electricity consumption in proportion to the quantity of water for purification and taking into account the target purity level of water. To achieve a better purity level with a particular consumption of electricity, it is known to add certain additives to the process, for example, to the water for purification, before electrodes. In addition, a problem in the prior art is the disposal of floc material generating as a side product, which increases the costs of water purification.

BRIEF SUMMARY

The aspects of the disclosed embodiments are directed to providing a process for purification of water to a purity level according to the application in an economical way. In addition, the use of the floc material produced is provided, by means of which the costs of the process notably decrease or even change into profit. It has been noted that by adding an additive that enhances floc formation to water for purification or to purified water, it is possible to achieve the purity level according to the application with a lower energy consumption and lower anode wear compared to a situation where such material is not supplied to the process. It has also been noted that an efficient purification effect is already achieved with a small amount of additive, such as at least 1 g and less than 50 g measured as dry matter per each cubic metre of water for purification. Since the additive costs, a small quantity of additive influences the overall economy of the process.

DESCRIPTION OF THE EMBODIMENTS

Figure 1:
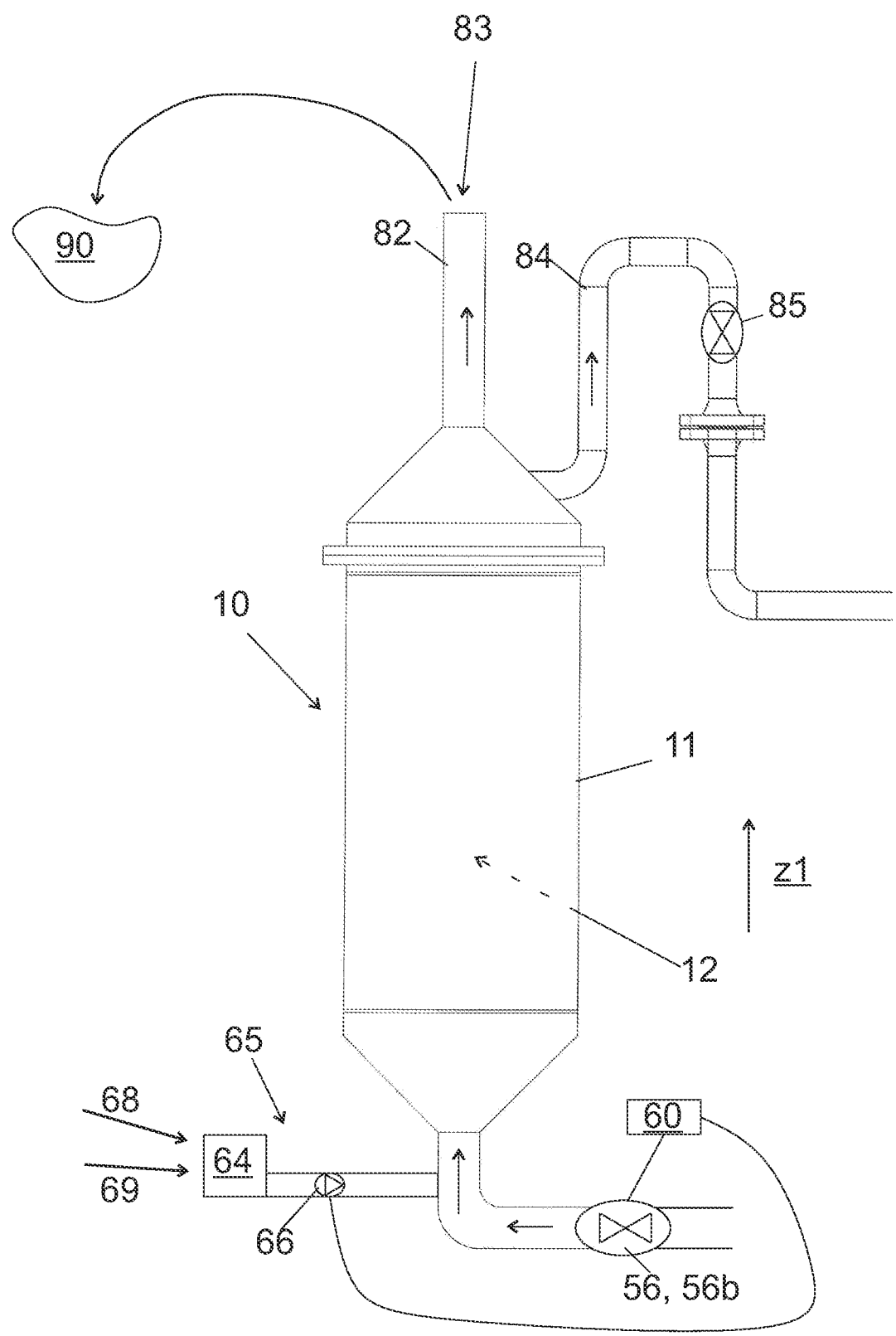
FIG. 1 is a side view of a water purifier.

In this application, the term "generalized cylindrical shell" means the plane that a line segment forms when passing along a closed curve. Advantageously, generalized cylindrical shell refers to the shell of a cylinder with a circular bottom, i.e., the shell of a cylinder. An example of a generalized cylindrical shell, which is simultaneously a shell of a cylinder, is the longitudinal section of a pipe with a circular cross-section. Said longitudinal direction is denoted with symbol $z0$ in the drawings.

In this application, symbol $z1$ means the upward direction. During use, the above-mentioned longitudinal direction $z0$ may be oriented essentially in the vertical direction as described below. The transverse direction means any direction perpendicular to the longitudinal direction. Some transverse directions perpendicular to each other are denoted with symbols x and y. For example, the longitudinal direction may mean the longitudinal direction $z0$ or the vertical direction $z1$.

The apparatus according to the examples is called water purifier 10 or equipment 10 for purification of water. Equipment 10 for purification of water is equipment that is suitable for purifying water. A water purifier 10, in addition to being suitable for purifying water, is also arranged to purify water.

Referring to FIGS. 2a-4b, an equipment for purifying water comprises a cathode 20 and an anode 30 as electrodes. The cathode 20 is an electrode that does not wear during electrolysis and the anode 30 is an electrode that wears during electrolysis. Electrolysis is provided using a power source 50. The power source 50 is arranged to provide a primary voltage V1 and a secondary voltage V2, of which the primary voltage is higher than the secondary voltage (V1>V2). It is possible that one of these voltages (V1, V2) is ground potential.

Figure 6:
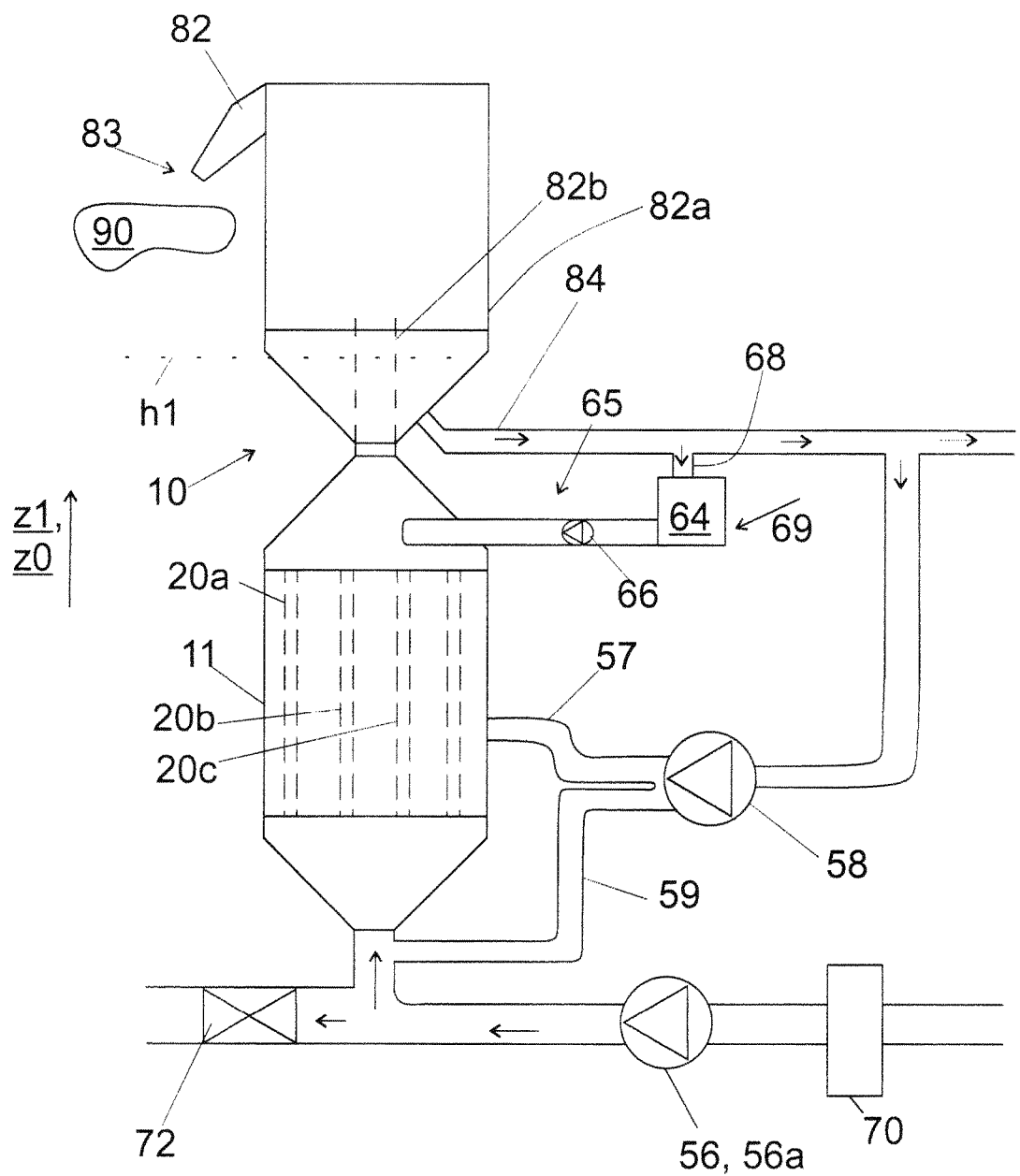

Said primary voltage V1 is passed to the anode 30 via a first electric cord 52. Said secondary voltage V2 is passed to the cathode 20 by means of a secondary electric cord 54. As a result of a voltage difference, cell reactions known as such start at the electrode pair (20, 30), specifically in the gap 25 between them, as is described above in context with the prior art technique. As a result of the reactions, impurities rise to the top in the inner part 12 of the water purifier as floc material 90, from where they can be removed, for example, via an opening 83, such as the end of a discharge pipe 82 (FIGS. 1 and 6). Correspondingly, purified water can be removed lower in the equipment via a discharge pipe 84 for purified water.

Floc material 90 can be removed via the opening 83 at least when the flow of purified water in the pipe 84 is suitably restricted. Such restriction can be performed with a valve 85, for example. Advantageously, the flow is restricted by utilising at least hydrostatic pressure of purified water.

Figure 2A:
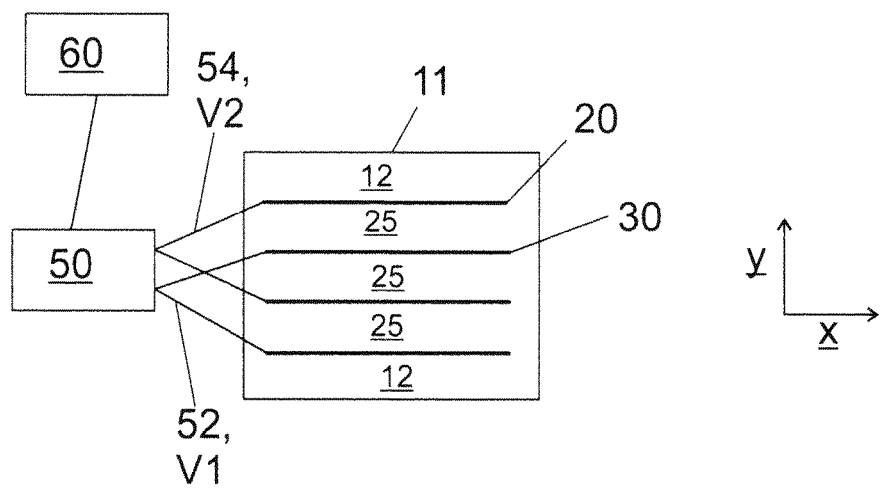
FIG. 2a is a top view of an electrode pair arrangement and a power source connected thereto, the electrode pair comprising a plate-like cathode and a plate-like anode as electrodes.
Figure 2B:
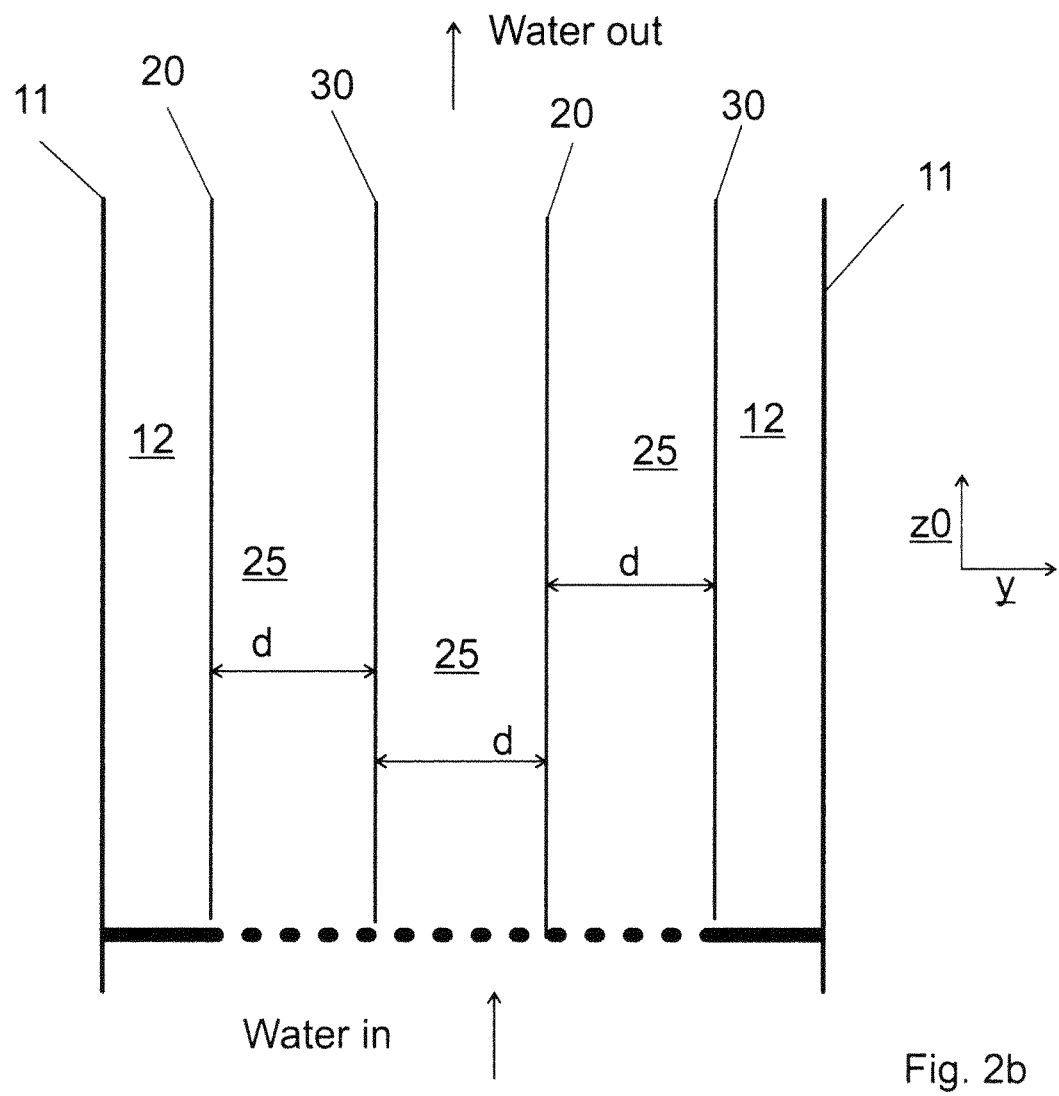
FIG. 2b is a cross-sectional side view of the electrode pair arrangement according to FIG. 2a, FIG. 3a is a top view of an electrode pair and a power source connected thereto, the electrode pair comprising a cathode as the outer electrode and an anode as the inner electrode, as well as a support for the anode in the inner-most position.

In FIGS. 2a and 2b, the cathode 20 has a plate-like shape. The anode 30 also has a plate-like shape. In the arrangement shown in FIGS. 2a and 2b, there are at least two cathodes and at least two anodes. Correspondingly, the water purifier has at least two or at least three gaps 25 for purifying water. The plane of a plate-like electrode defines two perpendicular directions, of which one can be called the longitudinal direction of the electrode. The length of the electrode in said longitudinal direction can be smaller than the width, or it can be larger than the width. Said longitudinal direction +z0 is advantageously arranged essentially vertical during the use of the water purifier. Such positioning facilitates the control of the water flow in the water purifier 10 and the collection of floc material in the top part of the water purifier. The longitudinal direction of the electrode 20, 30 is essentially vertical, when said longitudinal direction +z0 forms an angle of a maximum of 30 degrees with the upward vertical direction +z1 (or such angle is not formed; i.e., it is zero). Such a situation is shown in FIG. 6. Advantageously, said angle is below 10 degrees or below 5 degrees. The cathode 20 may be arranged inside an outer casing 11.

Water for purification is advantageously arranged to flow from the bottom to the top, as in FIGS. 2a-4b, or in another direction, such as the horizontal direction. Nevertheless, floc material essentially rises upwards, possibly slightly in the horizontal direction together with the flow. As regards the supply of an additive, it is advantageous that water for purification is arranged to flow from the bottom to the top.

The cathode 20 comprises a suitable electrically conductive material. An electrically conductive material means material whose resistivity is at most $10^{-2}$ $\lfloor$m at a temperature of 20° C. The cathode may be composed of such material. More advantageously, the resistivity of the material in question is at most $10^{-5}$ $\lfloor$m at least in one direction at this temperature; the direction may be relevant, since the material can be anisotropic. Advantageously, the cathode 20 comprises at least one of the following: steel, acid-proof steel, stainless steel and graphite. Most suitably, the cathode comprises steel, such as acid-proof steel, since the treatment and connection to other constructions of such material is easy to carry out by welding or forcing, for example. Furthermore, steel is a relatively inexpensive material. The dimensioning of the cathode 20 can be selected as needed. For example, the cathode 20 can be made of a plate with its thickness ranging between 0.5 mm and 5 mm, such as 1 mm-3 mm, for example, approximately 2 mm. The length of the cathode 20 can be selected as needed. For example, the length can be at least 30 cm-5 m, 50 cm-2 m, or 75 cm-1.5 m.

The anode 30 comprises an electrically conductive material. Advantageously, the anode 30 comprises such electrically conductive material whose resistivity is at most $10^{-2}$ $\lfloor$m, more advantageously at most $10^{-5}$ $\lfloor$m, at a temperature of 20° C. Specifically, the electrically conductive material of the cathode 20 is not in contact with the electrically conductive material of the anode 30. In the electrode pair (20, 30) formed by the anode 30 and the cathode 20, a gap 25 remains between the anode 30 and the cathode 20 in said transverse direction. In the gap 25, firstly, said water can be purified by means of electrolysis and secondly, water can be transferred in said longitudinal direction +z0 from the bottom to the top, for example. The gap 25 causes that the electrically conductive materials of the electrodes (20, 30) are not in galvanic contact with each other. Thus, an electric voltage difference V1–V2 (i.e., potential difference) may be present between them, by means of which electrolysis that purifies water operates. As is known, for example, from patent FI115904B, the material typically used as the cathode is more electronegative than the material used as the anode.

The anode 30 can be essentially as long as the cathode 20 or it can be shorter than the cathode. Most suitably, the length of the anode 30 is between 75% and 110%, more preferably between 85% and 100% of the length of the cathode 20.

Figure 3A:
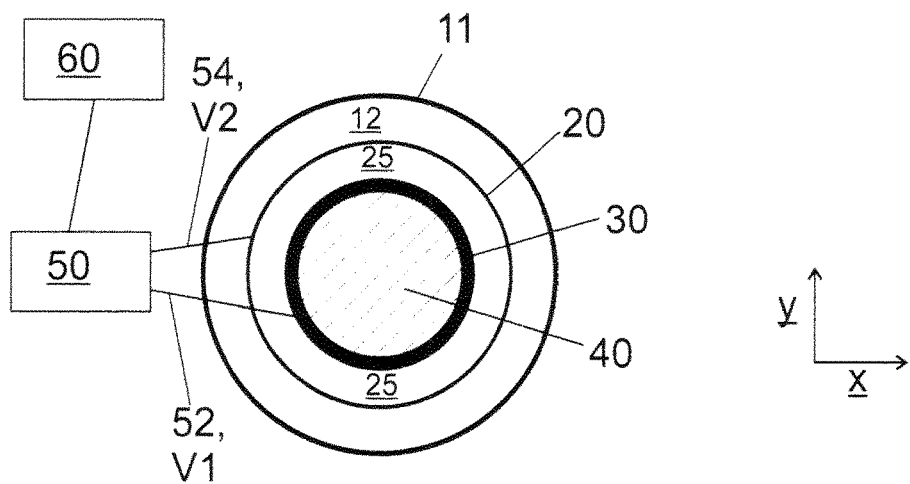
FIG. 3b is a cross-sectional side view of the water purifier according to FIG. 3a, FIG. 4a is a top view of an electrode pair and a power source or a power source arrangement connected thereto, the electrode pair comprising a cathode as the outer electrode and an anode as the inner electrode, as well as a support for the anode in the inner-most position.
Figure 3B:
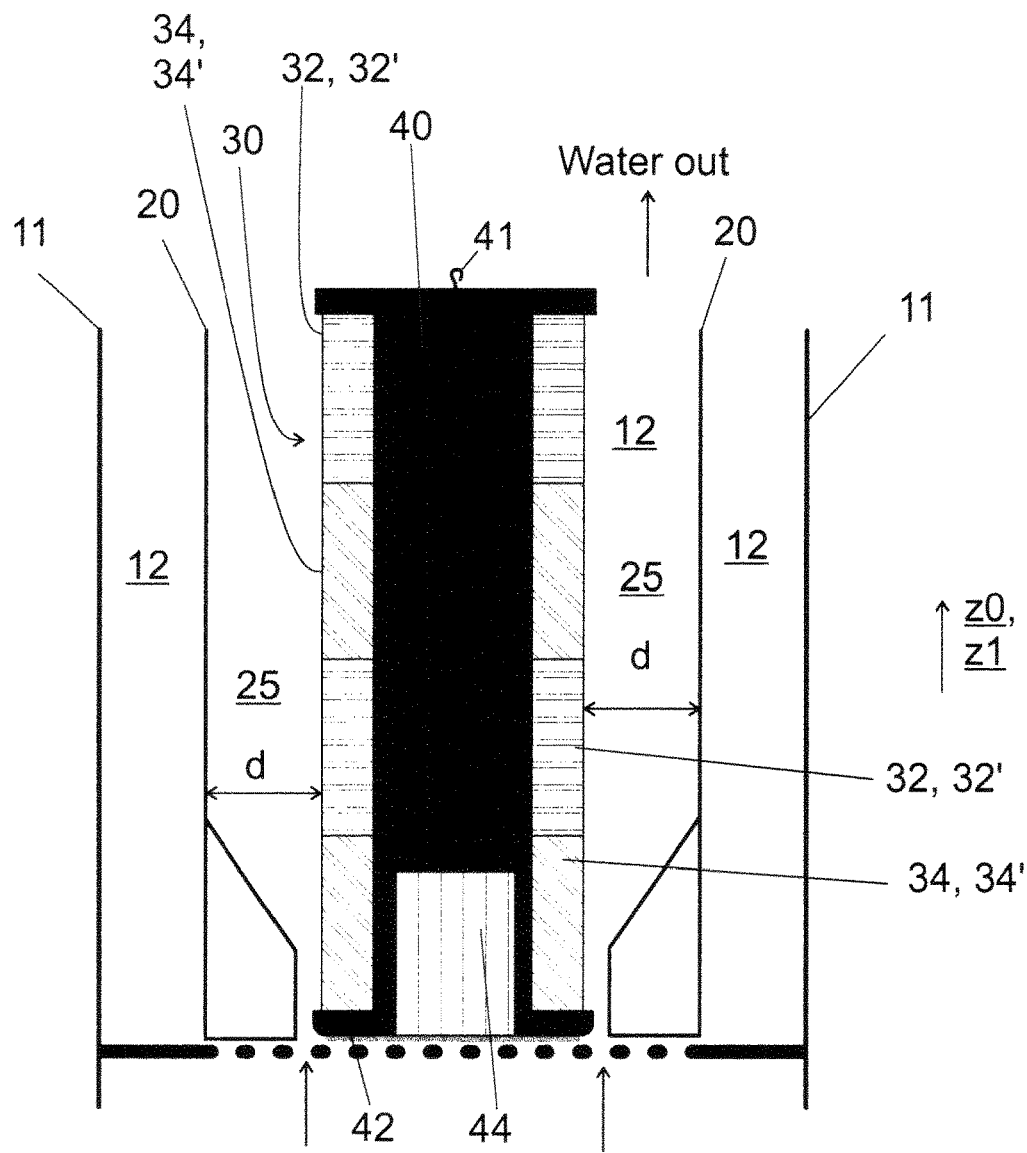

In FIGS. 3a and 3b, the cathode 20 is in the form of a generalized cylindrical shell, preferably a cylinder. This embodiment of the water purifier is proposed in the Finnish patent application FI20150258 and in the corresponding PCT application, which were not yet published at the time of preparation of this application. The outer surface of a component with a form of a generalized cylindrical shell comprises in each of its points a vector +z0 oriented in the same longitudinal direction +z0 of the cathode 20. Thus, the cathode is in the form of a profile extending in its longitudinal direction +z0, whose cross section in the perpendicular plane toward the longitudinal direction forms a closed curve (or a closed path without an end), preferably a circle. The longitudinal direction z0 is advantageously essentially vertical during use, in the way described above.

In this embodiment, the cathode 20 preferably has a form of a cylinder, or a shell of a cylinder with a circular bottom. This facilitates the manufacture of the cathode 20. The cathode 20 can be made from a pipe with its wall thickness ranging between 0.5 mm and 5 mm, such as 1 mm-3 mm, such as approximately 2 mm. The outer diameter of said pipe may range, for example, between 50 mm and 150 mm, such as 60 mm-100 mm, such as approximately 75 mm. The length of the cathode 20 can be selected as needed. Most suitably, the length is larger than the diameter. For example, the length can be at least 30 cm-5 m, 50 cm-2 m, or 75 cm-1.5 m.

The anode 30 is also in the form of a generalized cylindrical shell, preferably a cylinder. In FIGS. 3a and 3b, the anode 30 remains within said cathode 20 in the perpendicular direction transverse to said longitudinal direction +z0. The transverse direction means any direction perpendicular to the longitudinal direction +z0. The longitudinal direction of the anode is essentially the same as the longitudinal direction +z0 of the cathode. This is the case when the cathode 30 is not in contact with the anode 20 although within it. Advantageously, the cathode 20 is in the form of a cylinder, the anode 30 is in the form of a cylinder and has a smaller diameter, and the longitudinal directions and the longitudinal centre axes of these cylinders are the same.

For preventing a water flow inside the anode 30, the support 40 for the anode is solid in one embodiment. An embodiment comprises a plug 44 or equivalent, with which water flow to the inside of the anode support 40 is prevented (see FIG. 3b).

Figure 5A:
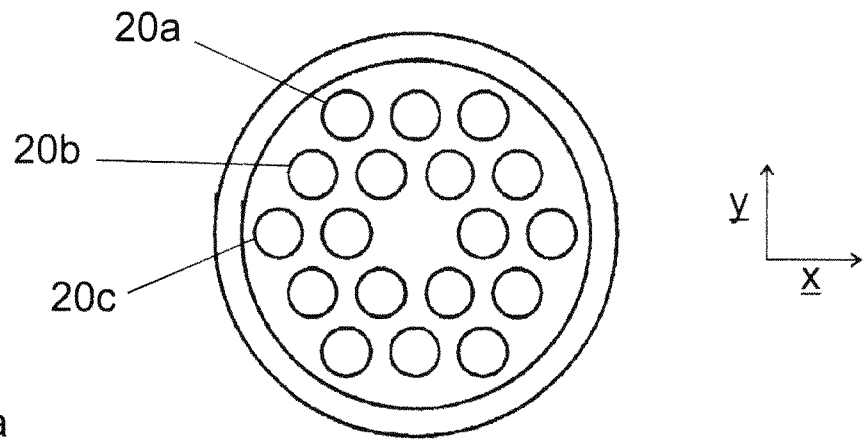
FIG. 5b is a perspective view of the electrode pair arrangement according to FIG. 5a, and FIG. 6 is a side view of a water purifier.
Figure 5B:
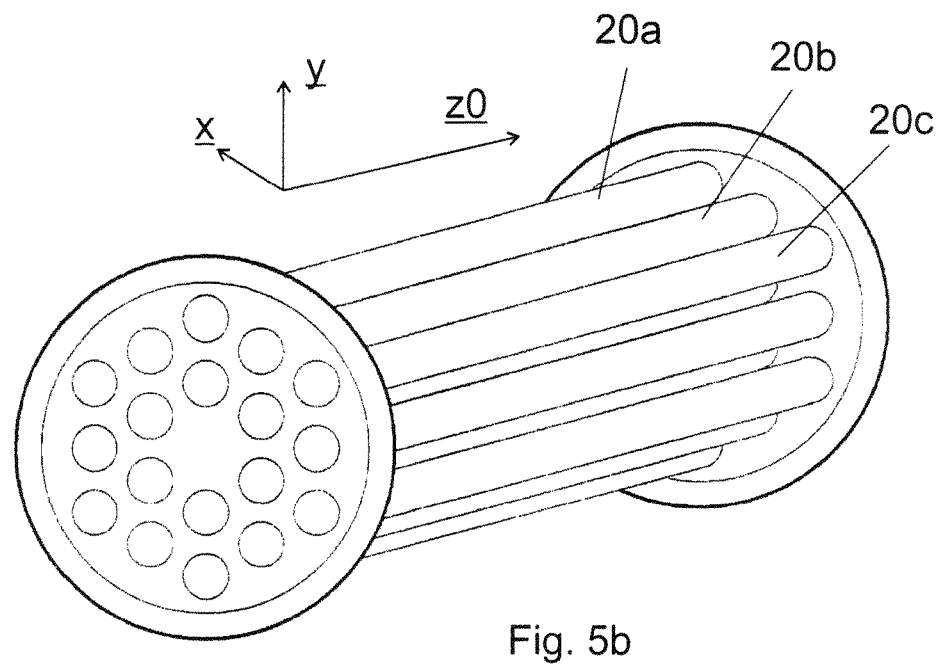

As regards purification of water, it is not relevant whether the anode 30 remains inside the cathode 20 or the cathode 20 inside the anode 30 in the perpendicular transverse direction toward the longitudinal direction +z0. Instead, this arrangement may be relevant in another way, for example, regarding the maintenance of the equipment 10, as is described in application FI20150258. If the water purifier 10 comprises more than one electrode pair, as in FIGS. 5a and 5b, the anode can be the inner-most electrode in some of them and the cathode can be the inner-most electrode in others. In FIGS. 5a and 5b, only cathodes 20a, 20b, 20 are shown, and an anode remains within each of these in these embodiments (not shown in FIGS. 5a and 5b).

Advantageously, the anode 30 has a similar cross-section to that of the cathode 20, most advantageously a cylinder. The outer diameter of the anode 30 is selected suitable considering the inner diameter of the cathode 20 and the width d of the gap 25 remaining between the electrodes, which will be discussed in more detail later. As the anode 30 wears during use, it can have a certain thickness in the transverse direction before use, such as between 5 mm and 35 mm, more preferably between 10 mm and 25 mm, such as approximately 20 mm.

Referring to FIGS. 1-6, the water purifier 10 advantageously comprises an outer casing 11, which limits the inner part 12 of the water purifier. The outer casing 11 is not absolutely necessary; however, it improves electrical safety of the water purifier. In FIG. 6, electrode pairs remaining in the inner part 12 are illustrated using reference numbers 20a, 20b and 20c.

As the anode 30 must be replaced from time to time, it is advantageous that the anode 30 is easy to replace. Therefore, the water purifier 10 of FIGS. 3a-4b comprises a support 40 extending in said longitudinal direction +z0 (see FIGS. 3b and 4b), of which at least a part is arranged inside the anode 30 in said transverse direction. The support advantageously extends in the longitudinal direction +z0 throughout the entire anode 30 inside the electrode; that is, inside the anode 30 in said transverse direction. With this, the benefit is achieved that the anode 30 can be lifted from the upper part of the support 40, although the anode 30 would be composed of separate parts. Disposed in the bottom part of the anode support 40, there are means for supporting the anode 30 in its bottom part upwards in said vertical direction +z1. In FIGS. 3a-4b, arranged in the bottom part of the anode support 40, there is a first projection 42 extending in the transverse direction from the frame of the anode support 40, such as a first flange 42, a bar 42, or a cross formed by two crossing bars. The first projection 42 is arranged to support the anode 30 in its bottom part upwards in said vertical direction +z1. According to the drawing, the first flange 42 is arranged to support the anode 30 below it, upwards in said vertical direction +z1. Consequently, the anode 30 can be replaced, for example, by lifting it using the anode support 40 and replacing the anode 30 or its parts. In an embodiment, the anode support 40 comprises means 41 for fastening a lifting device, such as a link or a hook 41, by which the support 40 and the anode 30 can be lifted. As will be described below, the anode 30 preferably comprises at least two parts; therefore, the lifting of the anode 30 might not be successful without said support 40. Lifting by the top part would only lift parts that are fixedly and solidly connected to the lifting point. The effect of the support 40 proposed is that an upwards +z1 force can be easily applied to the anode 30, below it or in its bottom part (such as the lower-most separate part) for lifting the anode 30.

Since different anode materials remove different impurities from water, in prior art solutions it is necessary to use at least two different water purifiers successively (i.e., in a cascade), using different materials in the anodes. Such an arrangement is rather large.

In the embodiments shown in FIGS. 3a-4b, the anode 30 comprises at least a first anode material 32 and a second anode material 34. These first 32 and second 34 anode materials are different from each other. Thus, it is possible to purify several types of impurities with a single anode 30. The anode 20 can naturally also comprise a third anode material and even further anode materials according to preference. Specifically, the anode 30 comprises both the first anode material 32 and the second anode material 34 on its outer surface; on that of its outer surfaces that is pointed towards the cathode. Thus, both anode materials 32, 34 are in contact with water running in the gap 25, and electrolysis that purifies water takes place effected by both anode materials 32, 34.

Figure 4A:
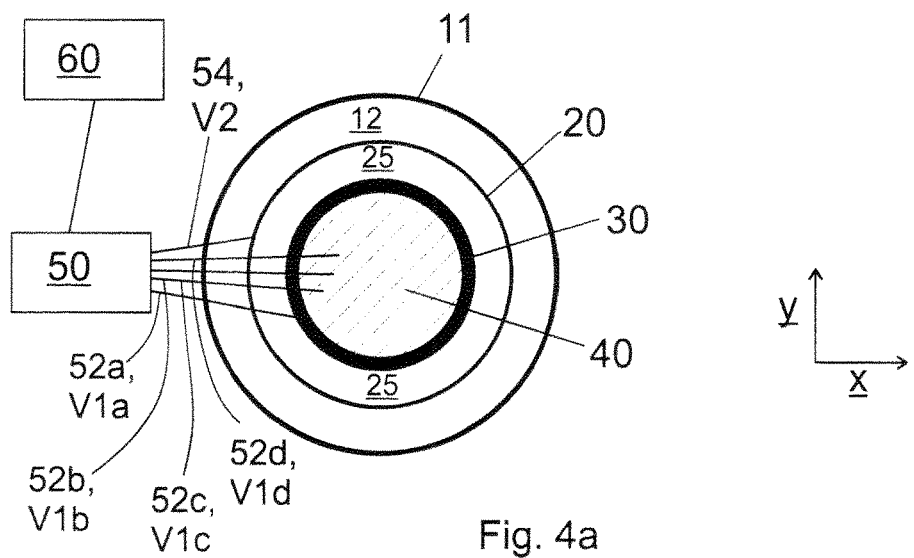
FIG. 4b is a cross-sectional side view of the water purifier according to FIG. 4a, FIG. 5a is a top view of an electrode pair arrangement.
Figure 4B:
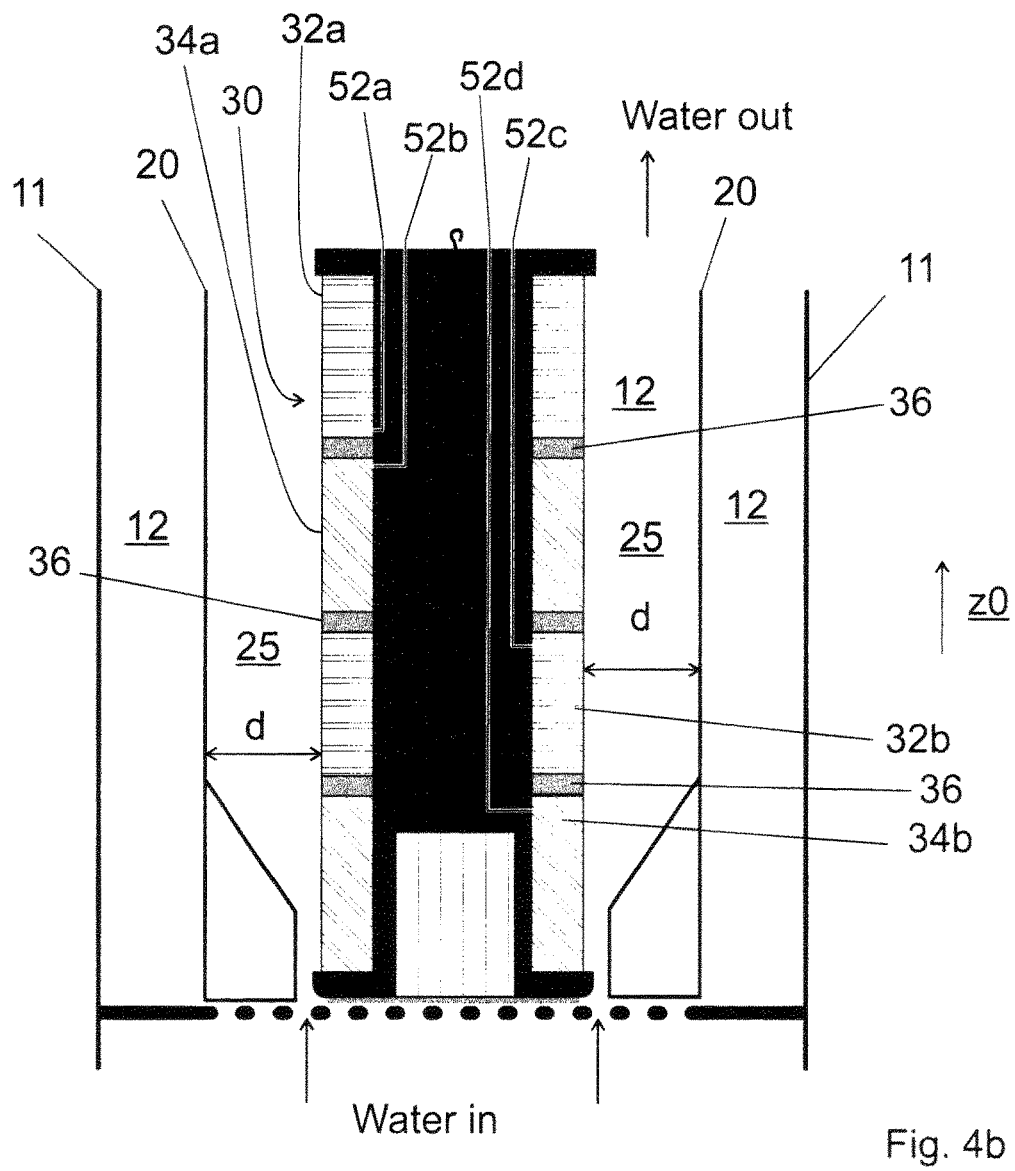

Specifically, according to FIGS. 3b and 4b, the anode 30 comprises a first area 32' or first areas (32a, 32b) comprising a first anode material 32, and a second area 34' or second areas (34a, 34b) comprising a second anode material 34. In addition, said first area 32' is separate from said second area 34'; in other words, the areas do not comprise the same part of the outer surface of the anode 30 that is pointed towards the cathode 20. Said first area or first areas may consist of said first anode material 32. Said second area or second areas may consist of said first anode material 34.

Suitable anode materials include multivalent metals, excluding mercury and any other metals that is/are in a liquid form at normal operating temperatures. With normal operating temperatures, the temperatures ranging between +0° C. ... +95° C., most typically between +10° C. ... +55° C., are meant.

For example, one of the following can be used as the first anode material: aluminium (Al), iron (Fe), magnesium (Mg), carbon (C), chromium (Cr), copper (Cu), manganese (Mn), tin (Sn), lead (Pb) and bismuth (Bi). As the second anode material, when such is used, another suitable material included in this list can be used. Advantageously, the first anode material comprises aluminium (Al) and the second anode material comprises iron (Fe). Advantageously, aluminium (Al) is used as the first anode material and iron (Fe) as the second anode material.

Advantageously, the first anode material 32 and the second anode material 34 are arranged in the anode 30 subsequently in said longitudinal direction +z0, whereat water for purification flows in the gap 25 beside both the first 32 and the second 34 anode material. Thus, water to be purified during the purification process is in contact with both the first 32 and the second 34 anode material. In FIGS. 3b and 4b, water for purification first flows beside the second anode material 34, after which water for purification flows beside the first anode material 32. It has been noted that when the first anode material comprises aluminium (Al) and the second anode material comprises iron (Fe), the part of the anode 30 containing iron (34', 34a, 34b) is arranged on the upstream side in the flow direction of water for purification relative to the part (32', 32a, 32b) of the anode 20 that contains aluminium. Since the flow direction of water in FIGS. 3b and 4b is from the bottom to the top, the iron electrode 34 is arranged below the aluminium electrode 32 in the height direction. Such an arrangement has shown to provide a good purification result. In addition, since the iron electrode is the first electrode contacting water, its wear increases. Nevertheless, iron is less expensive than aluminium, which is why such an electrode arrangement also contributes to keeping the operating costs low.

Arranged between the first 32 and the second 34 anode material, there may be spikes or equivalent for conducting electricity between different anode materials. Thus, various parts of the anode have the same electrical voltage. It has been noted, however, that in such a configuration electrodes usually wear unevenly, which increases the need of maintenance.

Referring to FIGS. 4a and 4b, if the anode 30 comprises more than one anode material, a different voltage is advantageously applied to different materials. For example, when the anode 30 comprises a first 32 and a second 34 anode material, a first primary voltage V1a can be applied to the first anode material 32 and a second primary voltage V1b deviating from the first primary voltage V1a can be applied to the second anode material 34 (i.e., V1a≠V1b). Both the first V1a and the second primary voltage V1b are higher than the secondary voltage V2. The voltage difference (V1a−V2) created by the first primary voltage can deviate from the voltage difference (V1b−V2) created by the second primary voltage, for example, at least by 5%, at least by 10%, or at least by 20%.

Electrically insulating material 36 is arranged between the first 32 and the second 34 anode material to be able to maintain a voltage difference. Electrically insulating material means material whose resistivity is at least 1 ⌊m at a temperature of 20° C. For example, referring to FIGS. 4a and 4b, a mutually equal voltage (V1a, V1c, V1a=V1c) can be applied to parts 32a, 32b of the anode 30 comprising the first electrode material 32 and a mutually equal voltage (V1b, V1d, V1b=V1d) can be applied to parts 34a, 34b of the anode 30 comprising the second electrode material 34 in such a way that a voltage applied to the first anode material 32 is different from that applied to the second anode material 34 (V1a≠V1b, for example, in the way described above).

Correspondingly, the equipment comprises a power source arrangement 50, which is arranged to generate a voltage, such as ground potential, for the cathode 20; said first primary voltage V1a and said second primary voltage V1b. In addition, the equipment 10 comprises a first power cord 52a for applying the first primary voltage V1a to the area of the anode (32', 32a), which comprises the first anode material 32. In addition, the equipment 10 comprises a second power cord 52b for applying the second primary voltage V1b to the area of the anode (34', 34a), which comprises the second anode material 34.

When using the water purifier, the first anode material 32 is consumed in an amount of a first quantity m1 per unit volume of water for purification and the second anode material 34 is consumed in an amount of a second quantity m2 per unit volume of water for purification. The quantity (m1, m2) means here the mass consumed (in grams, for example) or the thickness consumed (in millimetres, for example). In addition, the consumption naturally depends on the quantity of water for purification. For example, electrode material(s) may be consumed in an amount ranging between approximately 5 g and 100 g per cubic metre for purification depending on the purification need. In turn, the purification need is influenced by pre-screening, among other things.

Voltages (V1a, V1b) are advantageously controlled in such a way that said first quantity m1 is in the same order of magnitude with or approximately equal to the second quantity m2. More specifically, voltages (V1a, V1b) are advantageously controlled in such a way that the ratio (m1/m2) of the first quantity m1 to the second quantity m2 is between 0.1 and 10, more preferably between 0.25 and 4, and most preferably between 0.5 and 2. When the anode has only two parts, this is advantageously valid for the quantity referring to the mass. If the anode has more parts, these values advantageously refer to the total wear of the mass of different materials. In other words, voltages can be controlled in such a way that both materials are consumed in an amount that is in the same order of magnitude in total for different parts of the electrode in the sense mentioned above. For example, parts 32a and 32b may consume aluminium in total, for example, in an amount of a quantity m1 and parts 34a and 34 may consume iron in total, for example, in an amount of a quantity m2. When voltages are controlled in this way, the first primary voltage V1a is typically applied to the first anode material 32 and the second primary voltage V1b deviating from the first primary voltage V1a is applied to the second anode material 34 (i.e., V1a≠V1b). In this case, sufficient purification is typically ensured.

Referring to FIGS. 4a and 4b, if the anode 30 comprises at least two areas (32a, 32b) that are electrically isolated from each other, both comprising the first anode material 32, mutually different voltages (V1a, V1c, where V1c≠V1a) can be applied to the different areas 32a, 32b for optimising purification of water and/or wear of electrode parts. If the anode comprises at least two electric areas (34a, 34b) that are electrically isolated from each other, both comprising the second anode material 34, mutually different voltages (V1b, V1d, V1b≠V1d) can be applied to the different areas 34a, 34b for optimising purification of water and/or wear of electrode parts. For example, in the latter parts of the electrode pair in the flow direction of water, a voltage lower than that applied to the first parts in the flow direction of water can be applied, since water has already been partly purified in the later parts. This type of control can additionally ensure that electrode wear in the different areas (32a, 32b, 34a, 34b) is relatively even in the sense described above.

FIG. 4a shows a power source arrangement 50, which comprises one or more power sources. The power source arrangement 50 is additionally arranged to form a third primary voltage V1c and a fourth primary voltage V1d. Furthermore, the equipment 10 comprises a third power cord 52c for applying the third primary voltage V1c to the area of the anode 32' comprising the first anode material 32, to a part 32b that has been isolated from said area 32a. Furthermore, the equipment 10 comprises a fourth power cord 52d for applying the fourth primary voltage V1c to the area of the anode 34' that comprises the second anode material 34, to a part 34b that has been isolated from said area 34a.

When using the equipment 10, the first anode material 32 is consumed in an amount of a primary first quantity m11 per unit volume of water in the primary first area 32a and in an amount of a secondary first quantity m21 in the secondary first area 32b. In addition, the first anode material 34 is consumed in an amount of a primary second quantity m12 per unit volume of water in the primary second area 34a and in an amount of a secondary second quantity m22 in the secondary second area 32b. As above, the quantity may refer to mass or thickness.

Voltages (V1a, V1b, V1c, V1d) are advantageously controlled in such a way that said quantities m11, m21, m12 and m22 are in the same order of magnitude or approximately equal. More precisely, voltages (V1a, V1b, V1c, V1d) are advantageously controlled in such a way that the ratio of the smallest of the following: m11, m12, m21, m22 to the largest of the following: m11, m12, m21, m22 is between 0.1 and 1, more preferably between 0.25 and 1, and most preferably between 0.5 and 1. Specifically, when consumption refers to a change of thickness, uniform consumption ensures uniform wear of the different parts of the electrode.

Advantageously, the first anode material 32 is arranged in the anode 30 as one or more cylindrical rings and the second anode material 34 is arranged in the anode 30 as one or more cylindrical rings. Cylindrical rings mentioned in FIG. 3b are piled on top of each other to form the anode 30 in such a way that the first anode material 32 touches the second anode material 34 in the longitudinal direction +z0. Cylindrical rings mentioned in FIG. 4b are piled on top of each other to form the anode 30 in such a way that electrical insulation 36 remains between said cylindrical rings. Advantageously, the ring made from the first anode material 32 remains between two rings made from the second anode material 34 in the longitudinal direction +z0. Said rings can be equally high or their heights can be varied according to water for purification and/or control voltages.

When the parts of the anode are electrically insulated from each other by means of insulation 36, the anode comprises at least two parts that are electrically insulated from each other. In an embodiment, the anode comprises at least three parts that are electrically insulated from each other. In an embodiment, the anode comprises at least four (exactly four in FIGS. 3b and 4b) parts that are electrically insulated from each other.

The width d of the gap 25 is adapted according to the application. The width d of the gap 25 may depend on the point of observation, for example, if the electrodes 20, 30 are not completely parallel and/or completely of equal shape. The point of observation means here (a) a point on the plane of the anode 30 facing towards the cathode 20, or (b) a point on the plane of the cathode 20 facing towards the anode 30. Such a point of observation limits the gap 25. When viewed from this point of observation, the width d of the gap 25 means either (a, when the point of observation is on the surface of the anode 30) the shortest transverse distance to the cathode 20, i.e., to its inner surface, or (b, when the point of observation is on the surface of the cathode 20) the shortest transverse distance to the anode 30, i.e., to its outer surface.

Typically such shortest distance is oriented from said point of observation to the direction of the normal of the surface of the point of observation.

On one hand, the suitable width d of the gap 25 is limited by the composition of dirty water. Dirty water is typically pre-filtered using at least a screen 70 or equivalent. Most typically, the mesh size is approximately 8 mm in such screening. With a gap width d slightly larger than this, the operation is also ensured in cases where water for purification comprises impurities of this size. The water purifier 10 may comprise said screen 70 (FIG. 5). A smaller mesh size prior to the purification based on electroflotation reduces the need of electrical purification. Advantageously, the mesh size can be smaller, such as 2 mm or 5 mm. It is also possible to use screens of several sizes successively in such a way that the mesh size decreases in the flow direction.

In some embodiments, the width d of the gap 25, at least in some of the above-mentioned points of observation, is at least 2 mm, at least 5 mm, at least 8 mm, or at least 10 mm. In some embodiments, the width d of the gap 25, in all of the above-mentioned points of observation, is at least 2 mm, at least 5 mm, at least 8 mm, or at least 10 mm. In some embodiments, the average width d of the gap 25, calculated over all of the points of observation, is at least 2 mm, at least 5 mm, at least 8 mm, or at least 10 mm. If the water purifier comprises a screen with its holes having a mesh size, the width d of the gap 25 can be at least equal to said mesh size in all of the above-mentioned points of observation. With such dimensioning, blocking of the gap 25 is avoided, although water to be purified would contain even large impurity particles.

On the other hand, the suitable width of the gap 25 is limited by the operating voltage. The gap 25 must be sufficiently narrow in order that low operating voltages can be used and high electrical powers are avoided. In addition, a low operating voltage is advantageous in terms of operational safety.

In some embodiments, the width d of the gap 25, in all of the above-mentioned points of observation, is at most 25 mm, at most 20 mm, or at most 15 mm. In some embodiments, the average width d of the gap 25, calculated over all of the above-mentioned points of observation, is at most 25 mm, at most 20 mm, or at most 15 mm. Advantageous widths for the gap 25 are such where the average gap width, calculated over all of the above-mentioned points of observation, is between 2 mm and 25 mm, such as between 5 mm and 20 mm, particularly advantageously between 8 mm and 15 mm. Advantageous widths also include such where the width d of the gap in all of the points of observation is between 2 mm and 25 mm, such as between 5 mm and 20 mm, particularly advantageously between 8 mm and 15 mm.

The magnitude of the required voltage difference V1–V2 may depend on the purification need. The purification capacity is also influenced by the magnitude of electrical current passing through the electrodes, which naturally depends on the voltage difference. The magnitude of the purification need depends, among other things, on the flow of water for purification (magnitude of flow, e.g., $m^3/h$) through the equipment 10. Therefore, the water purifier 10 comprises means 56 (see FIGS. 1 and 5), such as a pump 56a and/or a valve 56b, for controlling the flow of water for purification (i.e., magnitude of flow). The pump 56a can be used, if the pressure of water for purification is not otherwise sufficient to provide a suitable flow. If, on the other hand, the pressure of water for purification is high, the flow can be restricted with the valve 56b, for example. In addition, it is possible to use a slightly over-dimensioned pump 56a and restrict the flow with the valve 56b.

Said power source 50 or power source arrangement 50 is arranged to provide voltages V1 (such as V1a, V1b, V1c and V1d) and V2, or the operating voltage V1–V2 of the electrode pair (20, 30) (or operating voltages V1a–V2 and V1b–V2; or V1a–V2, V1b–V2, V1c–V2 and V1d–V2). In an embodiment, said power source 50 is arranged to produce said primary voltage V1, which is higher than said secondary voltage V2 by 1 V-200 V, such as 2 V-100 V. As the anode 30 wears, the width d of the gap 25 slightly increases. Due to this, it may be necessary to increase the operating voltage V1–V2 during use. In an embodiment, the power source 50 is arranged to increase the voltage difference (V1–V2) between the electrodes 20, 30 during the purification of water. An increase in the voltage difference can be controlled by a control unit 60, for example (see FIGS. 2a, 3a, 4a).

It has been noted that a sufficiently strong electric field in the electrode pair (20, 30) over the gap 25 causes that microbes, such as viruses and bacteria in the water for purification, are killed. In addition, electric current also disintegrates other harmful substances, such as drugs and hormones, the residuals of which often occur in municipal wastewaters. It has been noted that in some cases the voltage difference sufficient for this purpose is approximately 1 V/m (or more). It has been noted that in some cases the electric field strength sufficient for this purpose (or voltage difference (V1–V2) divided by the width d of the gap 25 is approximately 100 V/m (or more); i.e., for example, 1 V, if the width d of the gap 25 is 10 mm. Here, the width d of the gap refers to the average width d of the gap calculated over all of the points of observation. When municipal wastewater, for example, has been processed with such an electric field, active microorganisms or other harmful substances will not appear in the floc material 90 (FIGS. 1 and 5). More advantageously, the electric field strength is 200 V/m-20 kV/m, such as 300 V/m-15 kV/m. In addition or alternatively, the voltage difference V1–V2 is advantageously between 1.5 V and 100 V, such as between 2 V and 50 V. If there are more than one different voltages V1a, V1b, said voltage and electric field strength apply to at least one part of the electrode pair; advantageously, said voltage and electric field strength apply to all parts of the electrode pair.

Since the floc material is sanitised in this way, it can be used as a soil conditioner, for example. It has been noted that such floc material comprises a great amount of nitrogen and/or phosphorous among others, both of which, in turn, work well as a soil conditioner. The amounts of nitrogen and/or phosphorous may even be such that it is not necessary to dilute the floc material when used as a soil conditioner. Therefore, floc material can be mixed with material that is poorer in nitrogen and/or phosphorous content, such as peat, before using it for soil conditioning. Alternatively, floc material can be used for manufacturing a soil conditioner, in which case a soil conditioner manufactured from this floc material can be used at a later stage. Floc material can be mixed with material poorer in nitrogen and/or phosphor content in a mass ratio of 1:50-1:1, such as in a mass ratio of 1:20-1:4. Thus, the concentration of floc material (percent by mass, later m/m) in a ready-to-use soil conditioner may range, for example, between 2 m/m and 50 m/m, such as between 5 m/m and 25 m/m. Said nutrient-poorer material may comprise at least one of the following: earth, peat, sand and clay.

Purified water can be used, according to FIG. 6, for flushing the electrodes 20, 30. For example, transverse openings may have been arranged in the outer electrode for cleaning. Thus, water can be pumped from the inner part 12 of the water purifier to the gaps 25 through said openings in the electrodes for flushing the electrodes. In FIG. 6, such a pump and a corresponding pipe are illustrated using reference numbers 58 and 57 respectively. For example, with a small pressure difference, it is possible to prevent water from flowing in a wrong direction through the openings in the outer electrode. According to preference, a container for purified water can also be used to ensure sufficiency of purified water for the above-mentioned cleaning purpose.

Alternatively, the pump 58 can be used to recirculate purified water through the gaps 25. By using a flow that is notably larger than during normal water purification, electrodes (20, 30) can be flushed in this way with purified water. This is illustrated in FIG. 5, where purified water can be conveyed along the pipe 59 into the gaps 25 of the electrode pairs. According to preference, a container for purified water can also be used to ensure sufficiency of purified water for the above-mentioned cleaning purpose.

By cleaning the electrode pair (20, 30) from time to time it is ensured that the purification result is sufficient. This, in turn, contributes to maintaining a low consumption of additive and/or electricity.

Furthermore, the water purifier 10 can comprise a valve 72 for draining water from the water purifier 10. By opening the valve 72 it is possible to remove the heavy matter accumulated on the bottom of the equipment. This heavy matter may originate from a dissolving electrode, for example. In an embodiment, the water purifier 10 is drained at intervals.

Referring to FIGS. 1 and 6, in the invention, an additive enhancing floc formation is supplied to purified water or to water for purification. With this, it is effected that water is purified more efficiently than without an additive. Correspondingly, the water purifier 10 comprises means 65 for supplying an additive to water for purification or to purified water. In FIG. 1, an additive is supplied to water for purification (i.e., in the flow direction on the upstream side relative to the electrode pair). In FIG. 6, an additive is supplied to purified water with the equipment 10 (i.e., in the flow direction on the downstream side relative to the electrode pair). The means 65 may comprise, for example, a container 64 and a pump 66. As an additive, an agent enhancing floc formation can be used; for example, to increase its tendency to form flocs. This improves the purification process in such a way that the electricity demand decreases and anode wear is reduced compared to a situation without an additive.

The additive can comprise a polymer. The additive can comprise a water-soluble polymer. The additive can comprise polyacrylamide (PAM). Dry polyacrylamide can be used as an additive. For example, such an agent is known under the trademark Superfloc®. The charge of polyacrylamide may be cationic, anionic or neutral.

It has been noted that the required quantity of the additive depends on its supply point. Advantageously, the additive is supplied, according to FIG. 6, in the flow direction of water for purification, after the electrode pair 20, 30. Advantageously, the additive is supplied, according to FIG. 6, in the vertical direction, above the electrode pair 20, 30. Thus, the vertical direction of electrodes is essentially upright in the sense described above, and water for purification is conveyed to the gap 25 from below.

It has also been noted that the required quantity of the additive depends on its supply method. The additive is advantageously supplied as a water solution. Referring to FIG. 1, the additive is advantageously supplied dissolved in purified water. In FIG. 1, purified water is brought to a container 64 along a channel 68. The supply of an additive to the container 64 is illustrated with the arrow 69. Referring to FIG. 6, an additive is most advantageously supplied dissolved in water that has been purified with the same equipment 10, which is used to purify water and to which the additive is supplied as a water solution. In FIG. 6, water purified with the equipment 10 is conveyed along the channel 68 to the container 64, where a suitable quantity of said additive is mixed with it. When added to the container 64, the additive can be dry. The supply of the additive is illustrated with the arrow 69. The water solution formed in the container 64 is introduced to purified water or to water for purification (preferably to purified water). The water solution formed in the container 64 is supplied to the equipment 10, from where water is conveyed to the container 64.

It has been noted that in arrangements and purification methods of this kind, quite a small amount of additive is sufficient, such as at least 1 g measured as dry matter per each cubic metre of water for purification. A suitable amount of additive measured as dry matter of additive is below 50 g per each cubic metre of water for purification, such as 5 g-49 g per each cubic metre of water for purification, and, for example, 10 g-40 g per each cubic metre of water for purification.

For example, a dry additive can be mixed in the container 64 with purified water, such as with water purified with the equipment 10, in an amount of 100 g-20 kg per each cubic metre of water brought to the container 64. Furthermore, this solution can be mixed with water for purification (FIG. 1) or with purified water (FIG. 6) in such a way that the amount of the additive used in the process remains within the above-mentioned limits. The pump 66 can be used to adjust the amount of the additive solution supplied.

Referring to FIGS. 1 and 2, a water purifier according to an embodiment comprises a control unit 60, which is arranged to control at least one, preferably all of the following: (a) said means 56 for controlling the flow of water for purification, (b) a power source arrangement 50, and/or (c) a pump 66 for supplying an additive solution. By controlling the power source arrangement 50, it is possible to control the operating voltage V1–V2, such as operating voltages (V2, V1$a$, V1$b$), such as operating voltages (V2, V1$a$, V1$b$, V1$c$, V1$d$).

Depending on the purification need and the size class, the water purifier 10 may comprise only one electrode pair (20, 30), as in FIGS. 3$a$-4$b$, or more than one electrode pair, as in FIG. 2. Electrode pairs according to FIGS. 3$a$-4$b$ can be arranged several in parallel to increase the purification capacity.

It has been noted that the separation of floc material 90 from purified water takes some time. Referring to FIG. 6, floc material is advantageously separated from purified water in such a way that in the equipment, in a point h1 in the vertical direction, water from which floc material has not been separated is allowed to flow upwards inside the equipment 10, and in the same point h1 in the vertical direction but in a different point in the horizontal direction, water from which floc material has been separated is allowed to flow downwards inside the equipment 10. For example, in the internal pipe 82$b$ depicted in FIG. 6, at height h1, a mixture of purified water and floc material flows upwards. Correspondingly, inside the outer casing 82$a$ but outside the internal pipe 82$b$, at height h1, purified water, from which floc material has been removed, flows downwards.

Advantageously, the equipment 10 is dimensioned in such a way that the flowing of purified water from the upper edge of the electrode pair 20,30 to the point at which purified water is removed from the equipment (e.g., the point at which the discharge pipe 84 of purified water is connected to the equipment 10) takes at least 3 seconds, such as 5 s-200 s, more preferably 6 s-30 s, such as 8 s-15 s, such as approximately 10 s. This also ensures a sufficient exposure time for the additive to form flocs.

As described above, the water purifier 10 can be used, for example, in the mining industry, in the paper industry or for purification of municipal wastewaters. The water purifier 10 is particularly suitable for purification of municipal wastewaters. An arrangement comprises a residential building and a water purifier 10 according to any of the embodiments described.

It has been also noted that floc material produced particularly during purification of municipal wastewaters has an economically viable use as a soil conditioner and/or for manufacturing a soil conditioner, as described above. The use of floc material for soil conditioning is a method for improving soil. The use of floc material for manufacturing a soil conditioner is a manufacturing method of a soil conditioner. In such a method, floc material manufactured by purifying municipal wastewater using any of the methods described above for manufacturing floc material 90 is received (e.g., by purchasing). In addition, soil is improved with floc material 90, or a soil conditioner is manufactured using floc material 90. Optionally, floc material 90 is manufactured in such a method by purifying municipal wastewater using any of the methods described above. In addition, soil is improved with floc material 90 or a soil conditioner is manufactured using floc material 90. It is possible to purify water, during which floc material 90 is produced, and to use at least part of the floc material for own use for soil conditioning and/or sell at least part of the floc material to another party. It is possible to manufacture the first floc material by oneself, purchase a further amount (i.e., receive) of another floc material and improve soil with both the first and the second floc material, or produce a soil conditioner from these floc materials.

The following examples are related to the embodiments described above.

1. A method for purification of water with a water purifier (10), wherein
    the water purifier (10) comprises an anode (30) and a cathode (20) as electrodes in such a way that a gap (25) remains between the anode (30) and the cathode (20),
    a primary voltage (V1) is applied to the anode (30),
    a secondary voltage (V2) is applied to the cathode (20), where the primary voltage is higher than the secondary voltage (V1>V2),
    water for purification is conveyed to the gap (25), and
    an additive enhancing floc formation is introduced to water for purification or to purified water in an amount of at least 1 g and less than 50 g, measured as dry matter, per each cubic metre of water for purification.
2. A method according to Example 1, wherein
    the additive comprises a polymer, such as polyacrylamide, for example, cationic, anionic or neutral polyacrylamide.
3. A method according to Example 1 or 2, wherein
    the primary voltage (V1) and the secondary voltage (V2) create a voltage difference (V1–V2) and an electric field over the gap (25), and
    the voltage difference (V1–V2) is at least 1 V or the electric field strength ((V1–V2)/d) is at least 100 V/m; advantageously
    the strength of said electric field is 100 V/m-20 kV/m, or the voltage is 1 V
    100 V.
4. A method according to any of Examples 1 to 3, wherein
    the anode (30) comprises a first anode material (32) and a second anode material (34), the second anode material (34) being different from said first anode material (32), and
    water for purification flows in the gap (25) beside both the first (32) and the second (34) anode material; advantageously
    said first anode material (32) is aluminium and said second anode material (34) is iron;
most advantageously
in the anode (30), aluminium (32) is arranged in the flow direction of water for purification on the downstream side relative to iron (34).
5. A method according to Example 4, wherein
a first primary voltage (V1a) is applied to the first anode material (32), and
a second primary voltage (V1b) is applied to the second anode material (32), which
second primary voltage (V1b) is unequal to the first primary voltage (V1a); for example
said voltages (V1a, V1b) are controlled in such a way that
the first anode material (32) is consumed in an amount of a first quantity (m1) per unit volume of water for purification,
the second anode material (34) is consumed in an amount of a second quantity (m2) per unit volume of water for purification, and
the ratio (m1/m2) between the first quantity (m1) and the second quantity (m2) is between 0.1-10, preferably between 0.25-4, and more preferably between 0.5-2.
6. A method for improving soil or for manufacturing a soil conditioner, wherein
municipal wastewater is purified with a method according to any of Examples 1 to 5 for manufacturing floc material (90),
floc material (90) produced is collected and
soil is improved or a soil conditioner is manufactured using floc material (90).
7. A method according to any of Examples 1 to 6, wherein
said additive is supplied as a water solution;
advantageously
a dry additive is mixed with clean water for forming said water solution;
most advantageously
a dry additive is mixed with water purified with said water purifier (10) for forming said water solution.
8. A method according to any of Examples 1 to 7, wherein
said additive is supplied to a point located after the cathode (30) in the flow direction of purified water;
for example
an additive is supplied to a location that is higher than the top part of the cathode (30).
9. Floc material (90) manufactured in such a way that
municipal wastewater is purified with a method according to any of Examples 1 to 8, whereat
impurities contained in municipal wastewater for purification rise to the top of the water purifier (10) as floc material (90), from where said floc material (90) can be removed.
10. Use of the floc material according to Example 9 as a soil conditioner or for manufacturing a soil conditioner.
11. A method for improving soil or for manufacturing a soil conditioner, wherein
floc material manufactured by purifying municipal wastewater with a method according to any of Examples 1 to 8 for forming floc material (90) is received, and
soil is improved or a soil conditioner is manufactured using floc material 90.

The invention claimed is:
1. A method for purification of water with a water purifier, wherein the water purifier comprises an anode and a cathode as electrodes in such a way that
the anode and the cathode define a longitudinal direction,
a gap remains between the anode and the cathode,
the anode comprises a first anode material and a second anode material, the first anode material being aluminum and said second anode material being iron,
the first anode material and the second anode material are arranged in the anode subsequently in the longitudinal direction or electrical insulation remains between the first anode material and the second anode material in the longitudinal direction,
in the anode, aluminium is arranged in the flow direction of water for purification on the downstream side relative to iron,
in which method the longitudinal direction forms an angle of a maximum of 30 degrees with an upward vertical direction,
water for purification is conveyed to the gap, whereat water for purification flows in the gap beside both the first and the second anode material in said longitudinal direction from a bottom of the water purifier to a top of the water purifier,
a secondary voltage is applied to the cathode,
a first primary voltage is applied to the first anode material, and
a second primary voltage, which is unequal to the first primary voltage, is applied to the second anode material, and
which first and second primary voltages are higher than the secondary voltage, and
an additive enhancing floc formation is introduced to water in an amount of at least 1 g and less than 50 g, measured as dry matter, per each cubic metre of water for purification.
2. A method according to claim 1, wherein
the additive comprises a polymer.
3. The method according to claim 2, wherein
the polymer comprises polyacrylamide.
4. A method according to claim 1, wherein
the primary voltage and the secondary voltage create a voltage difference and an electric field over the gap, and
the voltage difference is at least 1 V or the electric field strength is at least 100 V/m.
5. The method according to claim 3, wherein
the strength of said electric field is 100 V/m-20 kV/m, or the voltage is 1 V-100 V.
6. A method according to claim 1, wherein
said voltages are controlled in such a way that
the first anode material is consumed in an amount of a first quantity per unit volume of water for purification,
the second anode material is consumed in an amount of a second quantity per unit volume of water for purification, and
the ratio between the first quantity and the second quantity is between 0.1-10.
7. A method according to claim 1, wherein
said additive is supplied as a water solution.
8. A method according to claim 1, wherein
said additive is supplied to a point located after the cathode in the flow direction of purified water.
9. A method for improving soil, wherein
municipal wastewater is purified with a method according to claim 1 for manufacturing floc material,
floc material produced is collected, and
soil is improved with the floc material.
10. A method for manufacturing a soil conditioner, wherein
municipal wastewater is purified with a method according to claim 1 for manufacturing floc material,
floc material produced is collected, and a soil conditioner comprising the floc material is manufactured.

* * * * *